(12) United States Patent
Teufel

(10) Patent No.: US 6,766,614 B2
(45) Date of Patent: Jul. 27, 2004

(54) AUTOMATIC LIQUID DISPENSING DEVICE WITH SMART PROPERTIES

(76) Inventor: George R. Teufel, 13131 NW. Laidlaw Rd., Portland, OR (US) 97229

( * ) Notice: Subject to any disclaimer, the term of this patent is extended or adjusted under 35 U.S.C. 154(b) by 0 days.

(21) Appl. No.: 10/227,748

(22) Filed: Aug. 26, 2002

(65) Prior Publication Data

US 2004/0035053 A1 Feb. 26, 2004

(51) Int. Cl.⁷ .......................... A01G 29/00; F16K 35/00
(52) U.S. Cl. ........................................ 47/48.5; 137/391
(58) Field of Search .................................. 137/137, 391

(56) References Cited

U.S. PATENT DOCUMENTS

| | | | |
|---|---|---|---|
| 2,739,939 A | * | 3/1956 | Leslie .......................... 210/127 |
| 2,991,911 A | * | 7/1961 | Spain .......................... 222/67 |
| 3,069,807 A | | 12/1962 | Wall |
| 3,125,255 A | * | 3/1964 | Kaiser .................... 222/189.06 |
| 3,357,129 A | | 12/1967 | Torrence |
| 3,430,823 A | | 3/1969 | Hunsaker |
| 3,438,575 A | | 4/1969 | Kohling |
| 3,758,987 A | | 9/1973 | Crane, Jr. |
| 3,856,205 A | | 12/1974 | Rohling |
| 3,874,402 A | * | 4/1975 | Hazen ......................... 137/137 |
| 3,906,978 A | | 9/1975 | Kurz |
| 3,981,446 A | | 9/1976 | Hunter |
| 4,321,937 A | | 3/1982 | Littlehale |
| 4,542,762 A | | 9/1985 | Littlehale |
| 4,653,529 A | | 3/1987 | Freeman |
| 4,846,206 A | | 7/1989 | Peterson |
| 5,440,835 A | | 8/1995 | Romo |
| 5,542,605 A | | 8/1996 | Campau |
| 5,956,899 A | | 9/1999 | DiOrio |
| 6,000,425 A | * | 12/1999 | Steinorth ..................... 137/391 |
| 6,128,856 A | | 10/2000 | Doan |

* cited by examiner

Primary Examiner—Charles T. Jordan
Assistant Examiner—Francis T. Palo
(74) Attorney, Agent, or Firm—Miller Nash LLP

(57) ABSTRACT

An automatic liquid dispensing device with smart properties. The automatic liquid dispensing device preferably includes a storage chamber, measuring chamber, and evaporation chamber. The evaporation chamber contains an evaporation pool that is inset in the evaporation chamber. The storage chamber and measuring chamber are operatively connected by a storage/measuring passage, the measuring chamber and evaporation chamber are operatively connected by a measuring/evaporation passage, and the storage chamber and evaporation chamber are operatively connected by a storage/evaporation passage.

18 Claims, 6 Drawing Sheets

FIG. 1
FIG. 2
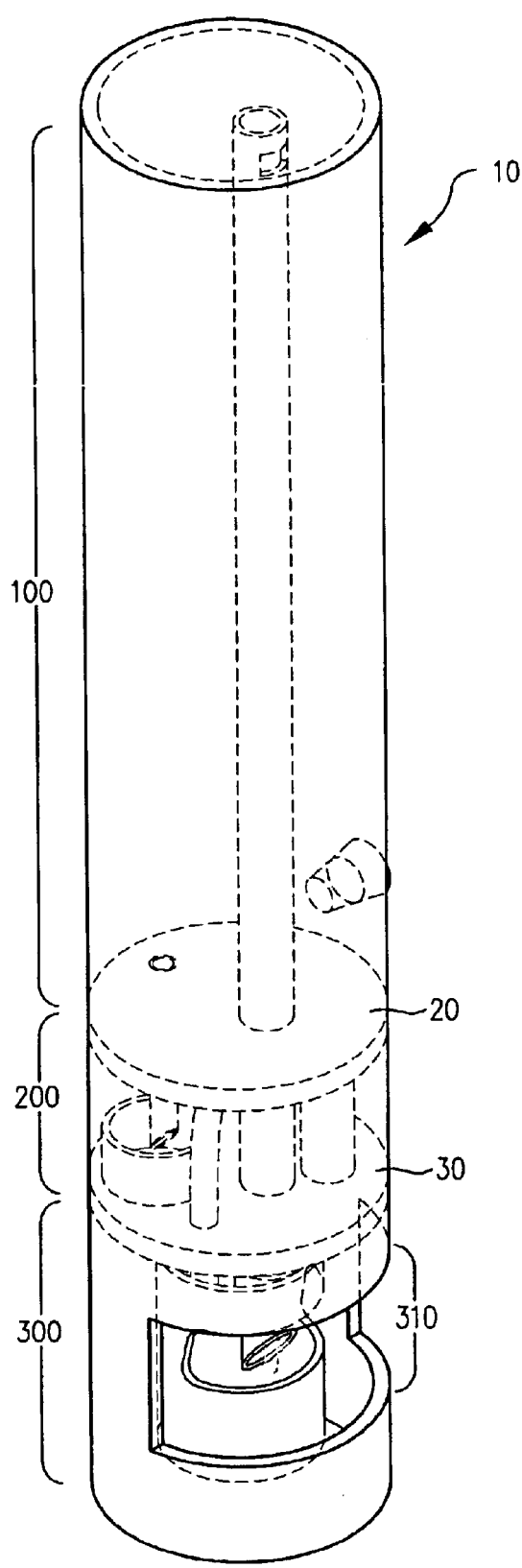
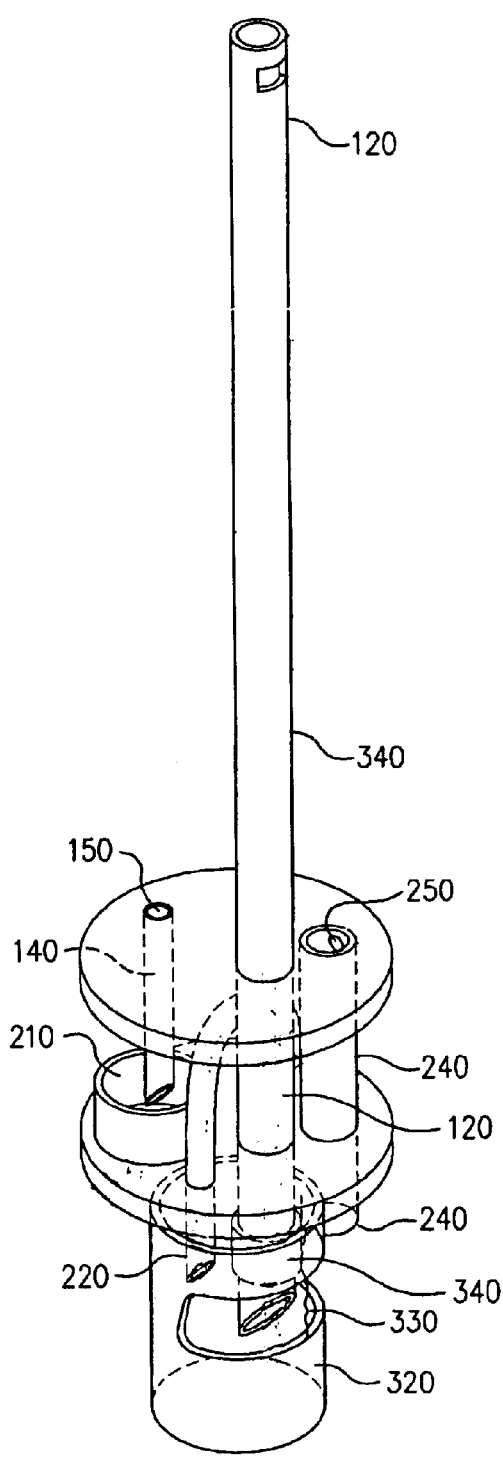

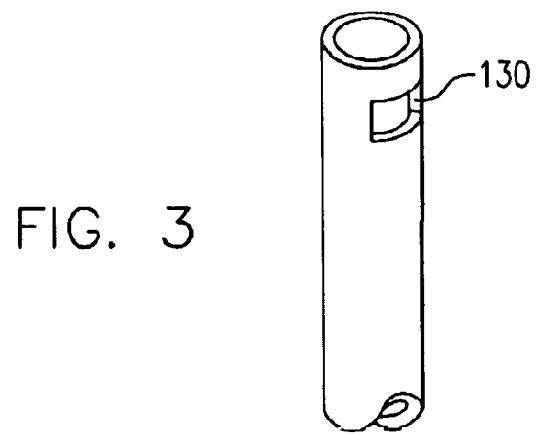
FIG. 3
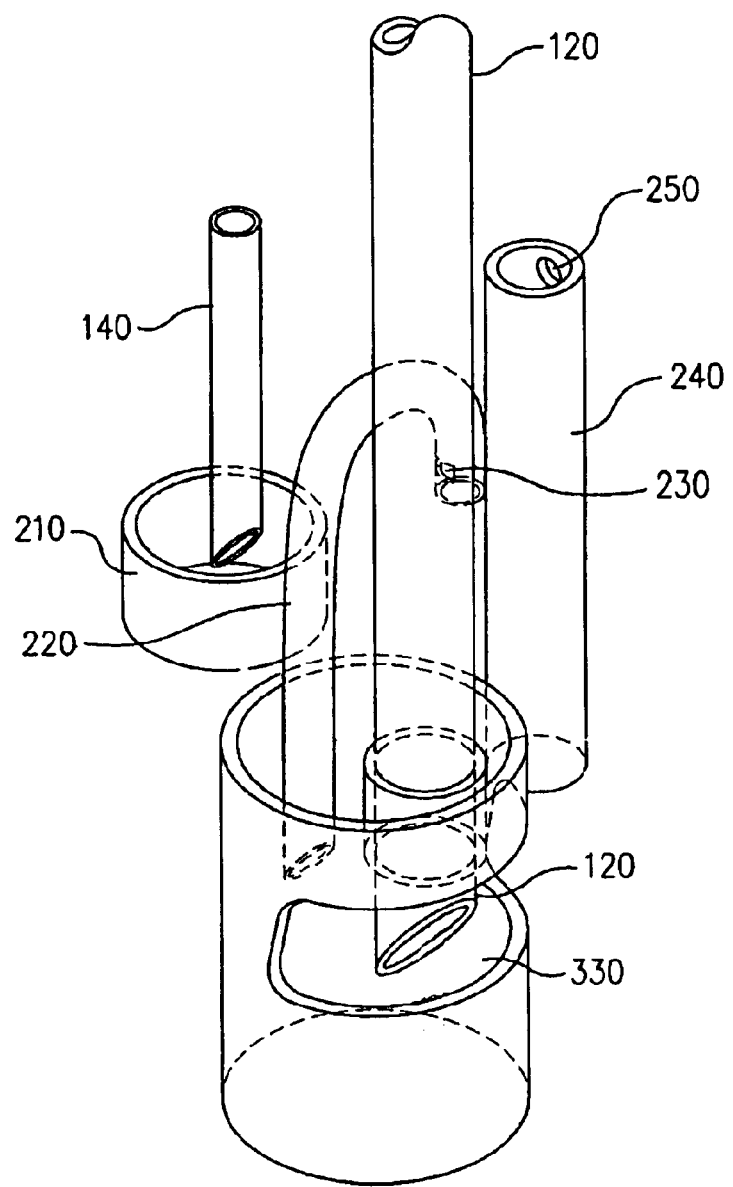

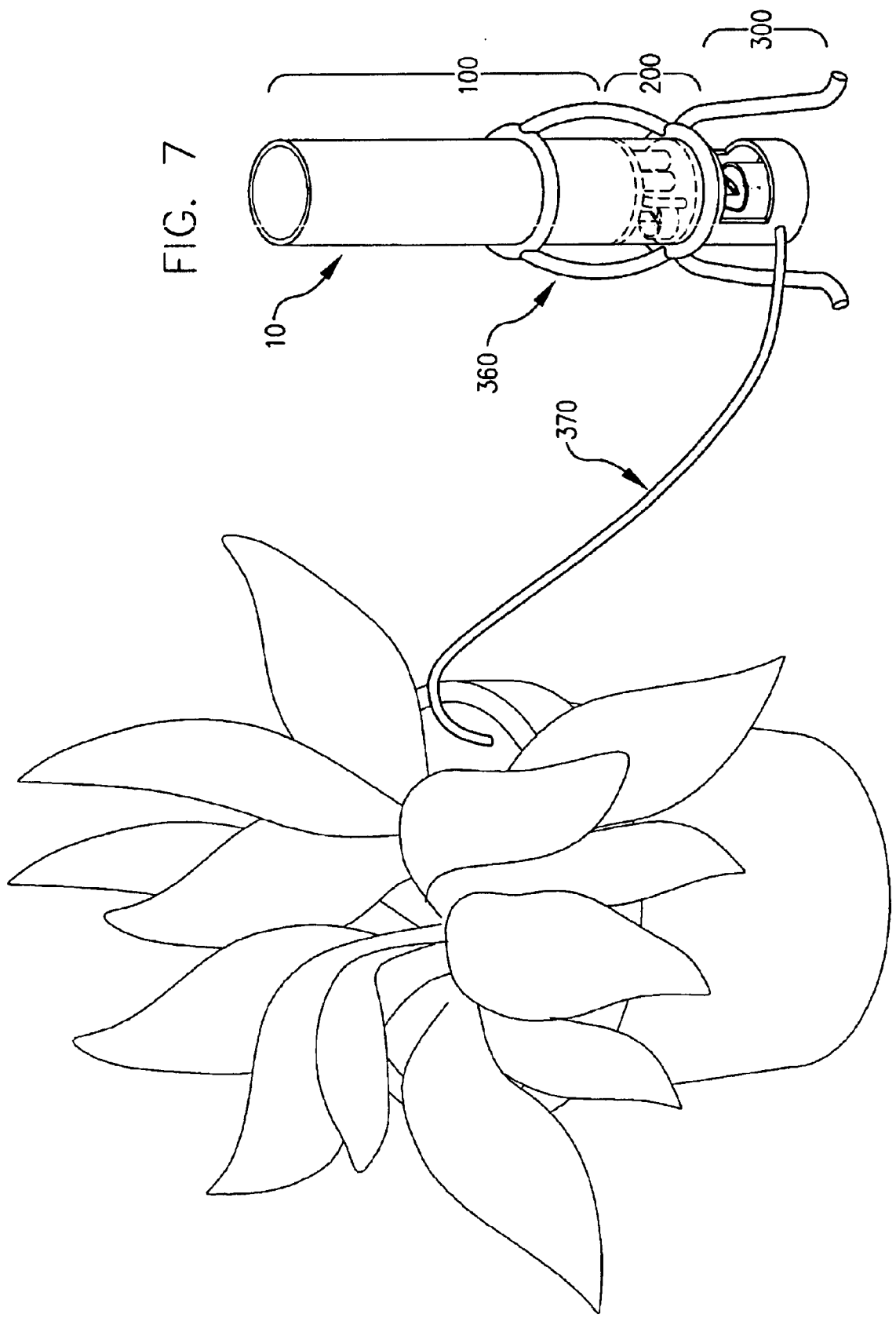

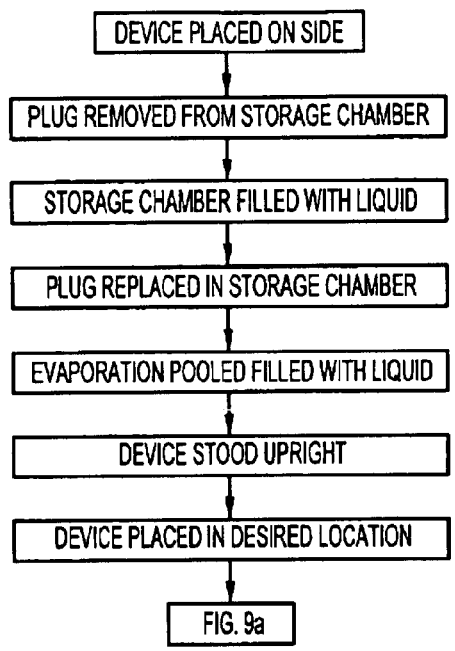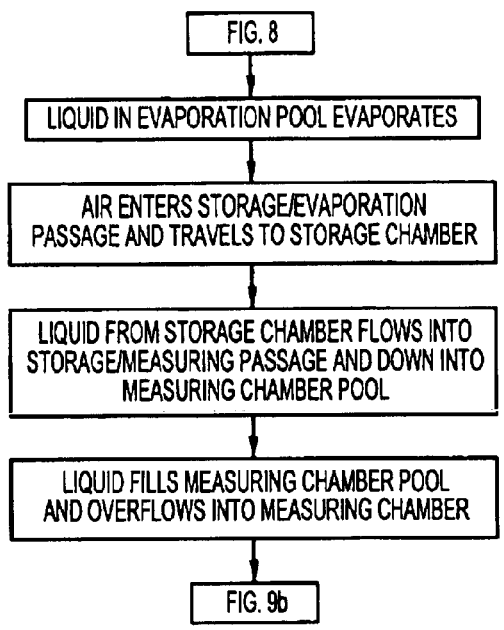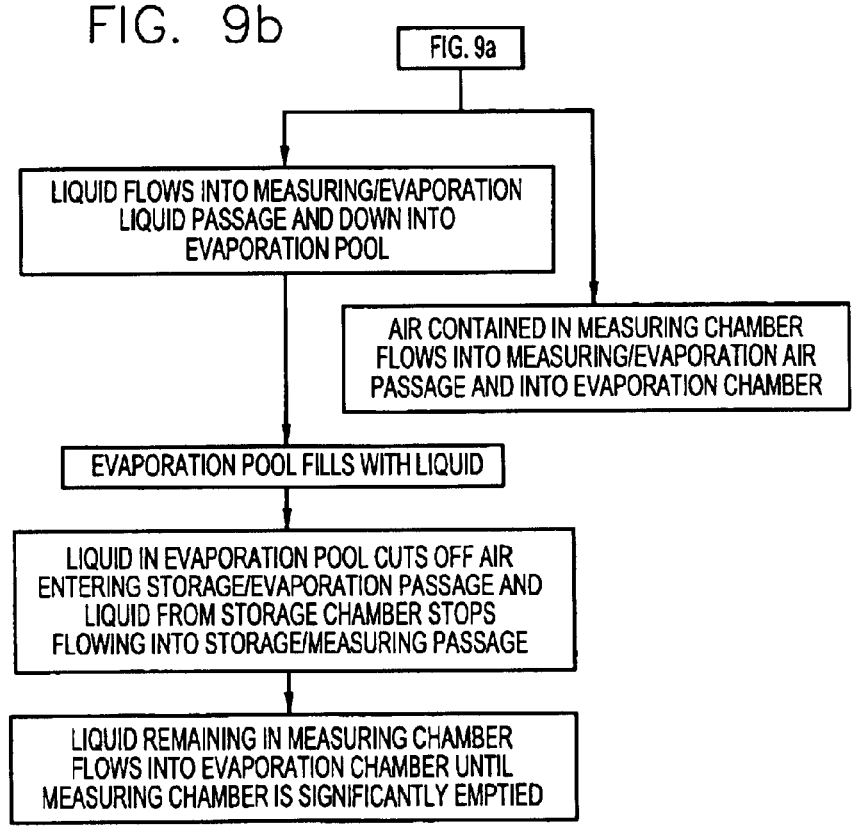

AUTOMATIC LIQUID DISPENSING DEVICE WITH SMART PROPERTIES

BACKGROUND OF INVENTION

1. Field of Invention

The present invention is directed to an automatic liquid dispensing device with smart properties.

2. Description of the Related Art

Liquids, such as water, fertilizer, nutrients, pesticides, and vitamins (hereinafter referred to as "liquids") are as vital for plants as they are for other organisms. The pressure of water within plant cells help the plant's leaves to remain firm. Liquids are involved in most of a plant's biochemical reactions. Liquids store and provide essential, dissolved nutrients.

How often plants need various types of liquid, and how much liquid is needed, depends on a variety of factors, including but not limited to the needs of a particular plant, the plant's root structure and depth, the plant's age, the season (e.g. in winter, when the days are short and the sun is low on the horizon, plants in leaf can exist for days or weeks on much less liquid than they demand in summer), the weather (e.g. temperature, humidity, rainfall, an amount of wind), the nature of the soil, density of plantings surrounding the plant, location of the plant (e.g. in direct sun, in complete shade, under cover, inside a shelter), and the method of application. To ignore these factors and provide liquid by calendar or clock may subject the plants to drought, drowning, malnourishment, fertilizer burn, or other calamities.

In terms of watering a plant, watering thoroughly and infrequently is generally considered the optimal method of watering. This is considered an optimal method of watering because plants generally fare better when they are sufficiently watered, when the water is allowed to drain, and when air is allowed into the soil. The best method for watering plants is to provide the water directly to the soil, rather than over the tops of the plants. The water should be applied at a rate no faster than it can percolate into the soil so that the excess will not run off and be wasted. This technique reduces water lost through evaporation and keeps leaves dry, which discourages diseases.

Liquid may be provided to plants by tools such as watering cans, traditional hoses, hoses with tiny holes all along their surface (e.g. soaker hoses), drip irrigation systems (e.g. plastic tubes with tiny holes punched in them at intervals), plastic jugs with small holes punched in the bottom filled with liquid and set beside a plant, and sprinklers. Providing liquids to large, densely planted areas, such as lawns or farm fields, requires a sprinkler or irrigation system. As is evidenced by the quantity of patents directed to liquid providing tools, many attempts have been made to improve upon the traditional liquid providing tools.

Patents directed to liquid providing tools generally fall into three categories. First, there are liquid providing tools that contain a sensor element embedded deep in the soil, near a plant's roots. Optimally, the sensor element determines when the plant or other material requires liquid by "sensing" the amount of liquid in the soil. The second category of liquid providing tools are those that contain a liquid-bearing container. When the plant requires liquid, the liquid located in the liquid-bearing container completely empties into the plant's soil in one cycle. Finally, there are liquid providing tools that use atmospheric conditions unrelated to a plant or the plant's soil to determine when liquid should be provided to the plant.

Patents disclosing liquid providing tools that contain a sensor element embedded deep in the soil include U.S. Pat. Nos. 3,856,205 and 3,438,575 to Rohling; U.S. Pat. No. 3,758,987 to Crane, Jr.; U.S. Pat. Nos. 4,321,937 and 4,542,762 to Littlehale; U.S. Pat. No. 5,956,899 to DiOrio; U.S. Pat. No. 3,069,807 to Wall; U.S. Pat. No. 3,981,446 to Hunter; U.S. Pat. No. 3,906,978 to Kurz; and U.S. Pat. No. 6,128,856 to Doan.

Embedding a sensor element deep in the soil of a plant requires invasive probing and digging in the plant's soil, which may cause severe damage and stress to the plant's roots. Further, if the sensor element is improperly located in the plant's soil (for example, far away from the plant's roots), the sensor element may not accurately sense the amount of liquid in the plant's soil, which may lead to over- or under-watering the plant.

Patents disclosing liquid providing tools containing liquid-bearing containers that completely empty into the soil of a plant or the plant's soil in one cycle include U.S. Pat. No. 3,125,255 to Kaiser; U.S. Pat. No. 3,357,129 to Torrence; U.S. Pat. No. 3,430,823 to Hunsaker; U.S. Pat. No. 4,846,206 to Peterson; U.S. Pat. No. 5,440,835 to Romo; and U.S. Pat. No. 5,542,605 to Campau.

Completely emptying a liquid-bearing container in one cycle, may lead to over-watering of the plant, root rot, and/or the plant may die. Additionally, if the liquid-bearing container is not timely re-filled, the plant may become under-watered and/or die.

The third category of liquid providing tools is disclosed in U.S. Pat. No. 4,653,529 to Freeman. In this third category, atmospheric conditions that are unrelated to a plant or the plant's soil, are used to determine when liquid should be provided to the plant. This may lead to the over or under-watering of the plant.

BRIEF SUMMARY OF THE INVENTION

The present invention is directed to an automatic liquid dispensing device with smart properties. All of the embodiments of the device of the present invention preferably include a storage chamber, measuring chamber, and evaporation chamber. The evaporation chamber contains an evaporation pool that is inset in the evaporation chamber. The storage chamber and measuring chamber are operatively connected by a storage/measuring passage, the measuring chamber and evaporation chamber are operatively connected by a measuring/evaporation passage, and the storage chamber and evaporation chamber are operatively connected by a storage/evaporation passage.

The foregoing and other objectives, features, and advantages of the invention will be more readily understood upon consideration of the following detailed description of the invention, taken in conjunction with the accompanying drawings.

BRIEF DESCRIPTION OF THE SEVERAL VIEWS OF THE DRAWINGS

FIG. 1 illustrates an exemplary embodiment of an automatic liquid dispensing device of the present invention.

FIG. 2 illustrates an exemplary embodiment of an automatic liquid dispensing device of the present invention with portions removed to show underlying structure.

FIG. 3 illustrates a partial side view of an exemplary embodiment of the automatic liquid dispensing device shown in FIG. 2 with portions removed to show underlying structure.

FIG. 7 illustrates an exemplary embodiment of the automatic liquid dispensing device of the present invention.

FIG. 8 is a flowchart illustrating an exemplary method of "filling" the automatic liquid dispensing device of the present invention.

FIGS. 9a and 9b show flowcharts illustrating an exemplary "cycling" method of the automatic liquid dispensing device of the present invention.

DETAILED DESCRIPTION OF THE INVENTION

Figure 4:
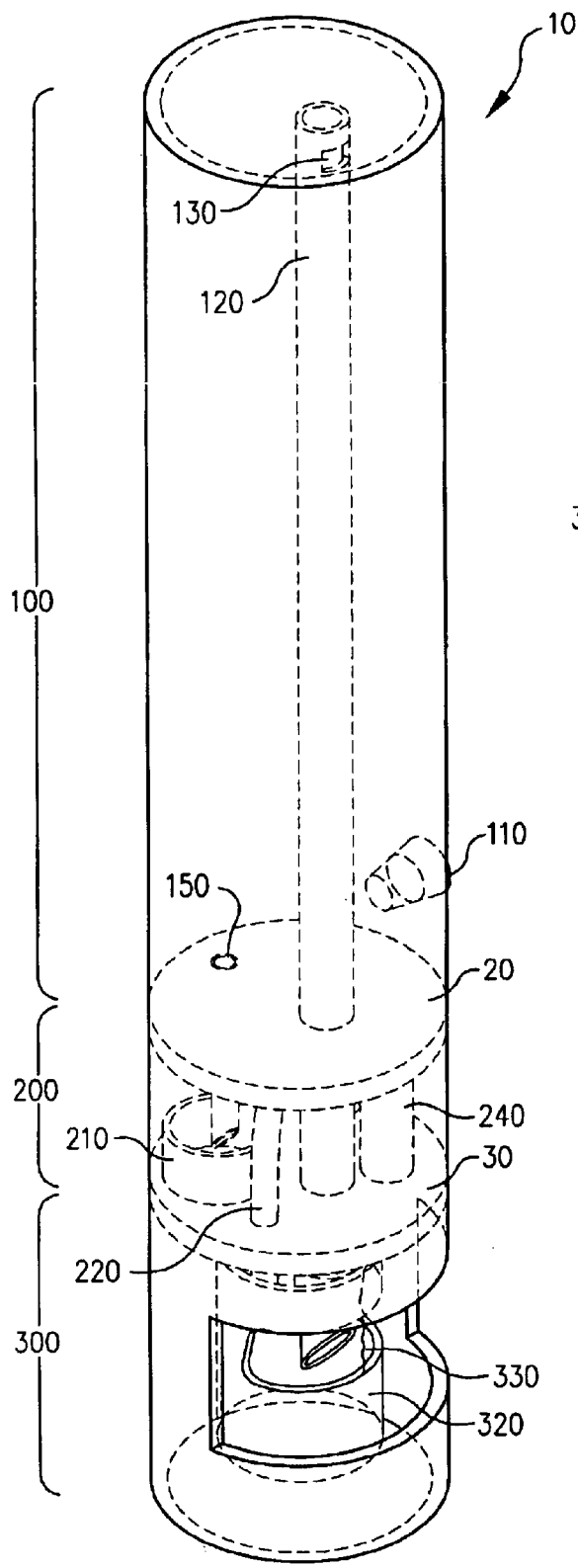
FIG. 4 illustrates an exemplary embodiment of an automatic liquid dispensing device of the present invention.

The present invention is directed to an automatic liquid dispensing device 10 with smart properties (hereinafter referred to as "device" or "liquid dispensing device"). Specifically, when placed on or near a plant, the automatic liquid dispensing device 10 senses the evaporation rate of a liquid and automatically begins a cycle that ultimately releases a measured amount of liquid to the plant. Because the automatic liquid dispensing device 10 is triggered by evaporation, it is able to adjust for variations in "climate factors," including the season, weather (e.g. temperature, humidity, rainfall, the amount of wind, density of plantings surrounding the plant, location of the plant (e.g. in direct sun, in complete shade, under cover, inside a shelter, and other factors related to the plant's general environment.

Various preferred embodiments of the present invention may be nonadjustable or adjustable to take into consideration "plant factors" and/or "liquid factors." Plant factors may include the needs of a particular plant, the plant's root structure and depth, the plant's age, the nature of the soil, and other factors related to the plant species or the specific plant. Liquid factors include the type of liquid being dispensed, the liquid's evaporation rate, and other liquid evaporation properties.

Although many preferred embodiments will be discussed herein, the automatic liquid dispensing device 10 generally will not require batteries or electricity. The lack of batteries or electricity allows the device 10 to continue functioning in power outages or battery failures. A user will not have to repeatedly check the device 10 to ensure that electricity or batteries are properly functioning. Similarly, the lack of electricity or batteries renders the device 10 harmless. Electrocution and battery corrosion will not occur on or in the device 10. Moreover, without the need for electricity or batteries, the device 10 may be installed in almost any location because the device 10 does not require electrical adaptors, outlets, plug-ins, or battery replacements.

Preferred embodiments of the device 10 have no moving parts. Further, in embodiments that include optional, adjustment mechanisms, once the device has been adjusted, there is no need for additional monitoring.

Physical Structure

The present invention is directed generally to an automatic liquid dispensing device capable of automatically releasing measured amounts of liquid to a plant. The device is preferably comprised of a storage chamber, evaporation chamber, and measuring chamber. Each chamber is operatively connected via passages.

FIGS. 1–4 show a first exemplary embodiment of the automatic liquid dispensing device of the present invention. The first exemplary embodiment of the automatic liquid dispensing device 10 of the present invention includes three chambers: a storage chamber 100, a measuring chamber 200, and an evaporation chamber 300. As shown in the exemplary embodiment shown in FIG. 1, the three chambers are separated by a storage/measuring separator 20 and a measuring/evaporation separator 30.

In the exemplary embodiment shown in FIG. 1, the storage chamber 100 is the upper chamber and is adapted to store liquid. As will be further discussed, at the start and end of a cycle, the storage chamber 100 will be under vacuum pressure. Optimally, liquid fills the entire storage chamber 100. Without air being admitted into the storage chamber 100, the liquid remains in the storage chamber 100 even against the effects of gravity.

While FIG. 1 shows the storage chamber 100 as being cylindrical, it should be noted that the storage chamber 100 may be any size, shape, or dimension. For example, the storage chamber 100 may be a bottle (e.g. 5-gallon, one-gallon, recycled soft drink bottle) or a novelty shape (e.g. shaped as a teddy bear, flower, watering can, bird house). Further, the design of the storage chamber 100 may be such that the storage chamber 100 is interchangeable with other storage chambers 100. This would allow a user to provide a smaller storage chamber 100 when the storage chamber 100 will be frequently filled with liquid by the user, and a larger storage chamber 100 when the storage chamber 100 is infrequently filled with liquid by the user.

In the embodiment shown in FIG. 1, the measuring chamber 200 is the middle chamber and is adapted to measure liquid. The term "measure" is defined for purposes of the device 10, as providing a specific amount of liquid. "Measure" is also defined as not emptying the entire liquid supply located in the storage chamber 100 in a single cycle.

FIG. 1 shows the measuring chamber 200 as being cylindrical. However, the measuring chamber 200 can be easily manufactured in any size or shape. The measuring chamber 200 may be designed to specifically accommodate the needs of particular customers (e.g. agricultural, home user, grocer, medical), climate factors, plant factors, or liquid factors.

Moreover, the size and shape of the measuring chamber 200 may be made adjustable and/or interchangeable. In other words, the size and shape of the measuring chamber 200 may be changed for various purposes. This feature, however, is optional, because by changing the cycle frequencies through alternate embodiments of the device 10 that are further discussed below, the appropriate amount of liquid may be provided to a plant without having to adjust or interchange the measuring chamber 200.

In the embodiment of FIG. 1, the evaporation chamber 300 is the lower chamber and is adapted to allow the evaporation of liquid.

FIG. 1 shows the evaporation chamber 300 having an evaporation chamber window 310. As shown in FIG. 4, the evaporation chamber window 310 provides an inlet to the evaporation pool 320 that is inset in the evaporation chamber 300. The evaporation pool 320 has an evaporation window 330. The evaporation pool 320 and the evaporation window 330 can be easily manufactured into any size or shape. The purpose of the evaporation pool 320 is to measure the rate of evaporation. When liquid contained within the evaporation pool 320 falls to a certain level, air is admitted into the storage chamber 100 and a cycle begins.

While FIG. 1 shows the evaporation chamber 300 as being cylindrical, it should be noted that the evaporation chamber 300 may be any size, shape, or dimension. If a smaller size evaporation pool 320 is used, less liquid needs to evaporate to begin a cycle. Similarly, if a larger size evaporation pool 320 is used, a larger amount of liquid needs to evaporate in order to begin a cycle.

Additionally, the design of the evaporation chamber 300 may be such that a tubular transport structure 370 is situated within the evaporation chamber 300. This would allow the device 10 to be situated in different locations. For example, FIG. 7 shows a situation wherein there is no room within a plant pot for the device 10. Therefore, the device 10, or the storage chamber 100, measuring chamber 200, and evaporation chamber 300, may be placed remotely from the plant with the tubular transport structure 370 conveying the liquid released from the device 10 to the plant. A decorative stand, such as the rod iron stand 360 shown in FIG. 7, may be used to support the remote portion of the automatic liquid dispensing device 10.

The storage/measuring separator 20 separates the storage chamber 100 from the measuring chamber 200. As shown in FIG. 1, the storage/measuring separator 20 is an upper disk that divides and seals the storage chamber 100 and measuring chamber 200. The size and shape of the storage/measuring separator 20 may be changed based on the size and shape of the storage chamber 100 and measuring chamber 200. Further, the storage/measuring separator 20 may actually be in two parts, a part associated with the storage chamber 100 and a part associated with the measuring chamber 200 such that the two chambers 100, 200 could be in separate locations.

The measuring/evaporation separator 30 separates the measuring chamber 200 from the evaporation chamber 300. As shown in FIG. 1, the measuring/evaporation separator 30 is a lower disk that divides and seals the measuring chamber 200 and the evaporation chamber 300. The size and shape of the measuring/evaporation separator 30 may be changed based on the size and shape of the measuring chamber 200 and evaporation chamber 300. Further, the measuring/evaporation separator 20 may actually be in two parts, a part associated with the measuring chamber 200 and a part associated with the evaporation chamber 300 such that the two chambers 200, 300 could be in separate locations.

As shown in FIG. 2, the three chambers 100, 200, 300 are connected by a series of "passages."

The first passage is a storage/evaporation passage 120 that extends between and operatively connects the evaporation chamber 300 and the storage chamber 100. The evaporation chamber end of the storage/evaporation passage 120 is positioned at least partially within the evaporation chamber 300, and preferably within an evaporation pool 320 that is preferably inset in the evaporation chamber 300. The storage chamber end of the storage/evaporation passage 120 is positioned at least partially within the storage chamber 100. FIGS. 3 and 4 show the storage chamber end of the storage/evaporation passage 120 as having a vent hole 130, through which air is admitted into the storage chamber 100, which breaks the vacuum pressure therein to start a cycle.

The storage/evaporation passage 120 is shown as being a circular tube extending between the evaporation chamber 300, through the measuring/evaporation separator, the measuring chamber 200, the storage/measuring separator, and into the storage chamber 100.

The second passage is a storage/measuring passage 140 that extends between and operatively connects the storage chamber 100 and the measuring chamber 200. The measuring chamber end of the storage/measuring passage 140 is positioned at least partially within the measuring chamber 200, and preferably within a measuring chamber pool 210. The storage chamber end of the storage/measuring passage 140 is positioned at least as an opening 150 in the storage/measuring separator, thereby accessing the storage chamber 100. The storage/measuring passage 140 provides the means for liquid to flow from the storage chamber 100 to the measuring chamber 200.

The third passage is a measuring/evaporation liquid supply passage 220 that extends between and operatively connects the measuring chamber 200 and the evaporation chamber 300. The evaporation chamber end of the measuring/evaporation liquid supply passage 220 is positioned at least partially within the evaporation chamber 200, and preferably within the evaporation pool 320. The measuring chamber end of the measuring/evaporation liquid supply passage 220 is positioned at least partially within the measuring chamber 200.

As shown in FIG. 3, the measuring/evaporation liquid supply passage 220 is preferably an inverted U-shape siphon. The measuring/evaporation liquid supply passage 220 has a vent hole 230 located near the measuring chamber 200 end of the measuring/evaporation liquid supply passage 220. The vent hole 230 allows liquid to flow from the measuring chamber 200 into the evaporation chamber 300, and preferably, the evaporation pool 320.

The fourth passage is a measuring/evaporation air supply passage 240 that extends between and operatively connects the measuring chamber 200 and the evaporation chamber 300. The evaporation chamber end of the measuring/evaporation air supply passage 240 is positioned at least partially within the evaporation chamber 300, and preferably within the evaporation pool 320. The measuring chamber end of the measuring/evaporation air supply passage is located at least partially within the measuring chamber 200, and as shown in FIG. 3, provides a vent hole 250 through which air is forced into and transferred out of the device 10, which process will be discussed below.

Set-Up Procedure

Before operating the device 10 of the present invention, it must be "filled" with liquid. FIG. 8 details one exemplary method for "filling" the device 10 of the present invention.

In order to "fill" the device 10, the device 10 must first be placed on its side with the top of the storage chamber 100 slightly lowered. Then, the plug 110 located on the side of the storage chamber 100 is removed from the storage chamber 100. The storage chamber 100 is entirely filled with a desired liquid. After the storage chamber 100 is entirely filled with liquid, the plug 110 is replaced in the storage chamber 100. Ideally, replacing the plug 110 in the storage chamber 100 will prevent the leakage of any liquid from the storage chamber 100.

Still keeping the device 10 on its side, the evaporation chamber 300 is filled with a desired liquid.

After both the storage chamber 100 and the evaporation pool 320 have been filled, the device 10 is stood upright, with the storage chamber 100 above the evaporation chamber 300, and placed on top of the soil of the plant or other desired location depending on the type, size, and shape of the device 10 used.

It is preferred that the device 10 be placed on the soil of the plant, as it may more accurately sense the plant's demand for liquid because it can sense the humidity in the soil as well as the humidity in the air around the plant.

Moreover, because the device 10 sits on top of the soil where the plant is growing, there is no need for a probe or other sensing device to be embedded in the soil. Not only does this eliminate the necessity for digging, it also protects the roots of the plant from being damaged by an invasive probe. Additionally, the lack of probe allows the device 10 to be easily removed from one plant and used with another.

Optionally, after the device 10 has been "filled," the device 10 may be tested in order to determine whether it will properly function when placed in the desired location. The device 10 may be tested in two different ways; the device 10 as a whole may be tested and the device 10 may be tested once it has been set in place on the plant or other desired location.

In order to test the device 10 as a whole, after filling the device, the device 10 may be set in a dish, bowl, or any other apparatus that collects liquid. A user dips a sponge or other absorbent material into the evaporation pool 320, which is filled with liquid. As will be further discussed below, as the liquid in the evaporation pool 320 lowers, air is allowed into the evaporation chamber end of the storage/evaporation passage 120, thereby initiating a cycle.

In order to test the device 10 when in use, the user, after filling the device, simply sets the device 10 in the soil of the plant or other desired location, and allows the liquid in the evaporation pool 320 to lower to the point where air is allowed to enter the evaporation chamber end of the storage/evaporation passage 120, thereby initiating a cycle.

Cycle(s)

Once the device 10 has been filled, optionally tested, and set in the soil of the plant, the device 10 begins a series of cycles, with each cycle preferably comprising the following steps: evaporation, transmission of air from the evaporation chamber 300 to the storage chamber 100, flow of liquid from storage chamber 100 to measuring chamber 200, flow of liquid from measuring chamber 200 to evaporation chamber 300, and the release of a measured amount of liquid from evaporation chamber 300 to plant. FIGS. 9a and 9b detail one exemplary method of "cycling" for the device 10 of the present invention.

As previously stated, in a preferred embodiment, the storage chamber 100 has been entirely filled with liquid and the plug 110 has been replaced in the storage chamber 100. Additionally, the evaporation pool 320 has been filled with liquid. Preferably, when placed upright, the liquid in the evaporation pool 320 covers the evaporation chamber end of the storage/evaporation passage, which is preferably located in the evaporation pool 320. Because the evaporation chamber end of the storage/evaporation passage 120 is covered with liquid, air is not allowed into the evaporation chamber end of the storage/evaporation passage 120, thereby creating vacuum pressure in the storage chamber 100 such that liquid contained within the storage chamber 100 remains in the storage chamber 100 even against the effects of gravity.

According to the previously defined liquid, climate, and plant factors, the liquid in the evaporation pool 320 will evaporate. On a cool damp day, the evaporation rate will likely be low. On a hot, dry day, the evaporation rate will likely be high.

When the liquid in the evaporation pool 320 evaporates such that the evaporation end of the storage/evaporation passage opening is uncovered, a "cycle" begins. Air from the evaporation pool 320 is admitted into the evaporation chamber end of the storage/evaporation passage, and is ultimately admitted into the storage chamber 100 through the vent 130.

The air admitted into the storage chamber 100 from vent 130 breaks the vacuum pressure within the storage chamber 100. The air pushes down on the liquid contained within the storage chamber 100, ultimately causing the liquid to flow into the storage chamber opening of the storage/measuring passage 140 located at the bottom of the storage chamber 100.

The liquid in the storage/measuring passage 140 flows into the measuring chamber 200, and preferably, into a measuring pool 210, that is shown in FIG. 2 as being located within the measuring chamber 200 directly underneath the storage/measuring passage 140.

As liquid flows from the storage/measuring passage 140 into the measuring pool 210, air that was previously contained within the measuring chamber 200 is forced out of the measuring chamber 200 via the measuring/evaporation air passage 240, and specifically, through the measuring/evaporation air passage vent hole 250, shown in FIG. 3 as being located at the top of the measuring chamber portion of the measuring/evaporation air passage 240.

The air forced out of the measuring chamber 200 is forced down the measuring/evaporation air passage 240 and out into the evaporation chamber 300, and preferably, into the evaporation pool 320 located within the evaporation chamber 300.

As liquid continues to flow into the measuring chamber 200 from the storage/measuring passage 140, air continues to be forced out of the measuring chamber 200 via the measuring/evaporation air passage 240. The amount of air being forced out of the measuring chamber 200 is, preferably, directly proportional to the amount of liquid flowing from the storage chamber 100 into the measuring chamber 200 via the storage/measuring passage 140.

When the level of the liquid flowing from the storage chamber 100 to the measuring chamber 200 via the storage/measuring passage 140 reaches the top of the measuring pool 210, the liquid will overflow from the measuring pool 210 and flow into the measuring chamber 200.

As shown in FIGS. 2 and 3, located in the measuring chamber 200 is an inverted U-shaped siphon, previously referred to as the measuring/evaporation liquid passage 220. Located at the measuring chamber end of the measuring/evaporation liquid passage 220 is a measuring/evaporation liquid passage vent hole 230.

As the liquid overflows the measuring pool 210 and into the measuring chamber 200, the liquid in the measuring chamber 200 is forced into the measuring/evaporation liquid passage vent hole 230. As the liquid level in the measuring chamber 200 rises, liquid flows through the measuring/evaporation liquid passage 220 into the evaporation chamber 300, and preferably, into the evaporation pool 320 located within the evaporation chamber 300.

As liquid flows from the measuring/evaporation liquid passage 220 into the evaporation pool 320, the level of liquid in the measuring chamber 200 lowers. As a result, air flows from the evaporation pool 320, evaporation chamber 300, or outside atmosphere, and up through the measuring/evaporation air passage 240 and into the measuring chamber 200 via the measuring/evaporation air passage vent hole 250.

The level of liquid in the evaporation pool 320 rises due to the liquid flowing from the measuring chamber 200 to the evaporation chamber 300 via the measuring/evaporation liquid passage 220. When the liquid reaches a level within the evaporation pool 320, wherein the evaporation chamber end of the storage/evaporation liquid passage 120 is covered by liquid, air is prevented from entering the storage/evaporation passage 120.

Because air is unable to enter the storage/evaporation passage 120, vacuum pressure is once again created in the storage chamber 100, such that liquid contained within the storage chamber 100 remains in the storage chamber 100 even against the effects of gravity.

When vacuum pressure is created in the storage chamber 100, liquid contained within the measuring chamber 200 continues to flow to the evaporation chamber 300 until significantly emptied. It is preferred that some liquid remain in the measuring pool 210. Preferably, the pool of liquid in the measuring pool 210 covers the measuring chamber end of the storage/measuring passage 140. By covering the measuring chamber end of the storage/measuring passage 140, air is prevented from traveling through the storage/measuring passage 140 and into the storage chamber 100, thereby disrupting the vacuum contained therein.

Adjustment Mechanisms

In keeping with one of the principal objects of the device 10 of the present invention, which is providing liquid to an object (e.g. a plant), alternate embodiments are provided for adjusting the device 10 to change the cycle frequency.

In a first preferred embodiment of an adjustment mechanism for the device 10 of the present invention, the evaporation pool 320 may be adjustable by providing a height adjustment mechanism 340 that allows the evaporation pool 320 to slide up and down to a desired height within the evaporation chamber 300. For example, FIG. 2 shows an exemplary height adjustment mechanism 340 that is a tubular sleeve slidingly fit around a portion of the storage/evaporation passage 120 that is located at least partly within the evaporation pool 320. Preferably, the height adjustment mechanism 340 allows the measuring chamber 200 and storage chamber 100 to be raised and lowered, thereby fulfilling the same purpose as if the evaporation pool 320 slid up and down, but allowing for the convenience of keeping the evaporation pool 320 in a set location. By lowering the evaporation pool 320, less of the storage/evaporation passage 120 will be in the evaporation pool 320, thereby requiring less liquid to be evaporated in order to start a cycle.

If the device 10 is being used to provide liquid to a plant that doesn't require a significant amount of liquid, like a cactus, the user can lower the height adjustment mechanism 340 such that the storage/evaporation passage 120 is located towards the bottom of the evaporation pool 320. Because it will take a longer period of time for the liquid in the evaporation pool 320 to evaporate, the device 10 will cycle less frequently.

If the device 10 is being used to provide liquid to a plant that requires a significant amount of liquid, the height adjustment mechanism 340 can be raised towards the top of the evaporation pool 320. Because it will take a shorter period of time for the liquid in the evaporation pool 320 to evaporate, the device 10 will cycle more frequently.

Figure 5:
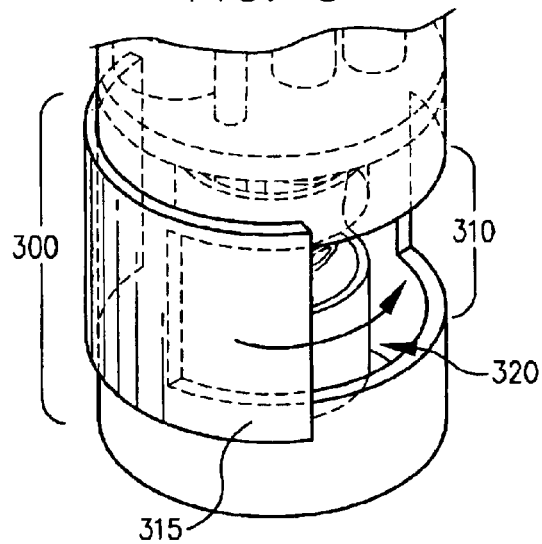
FIG. 5 illustrates an exemplary adjustment embodiment of the evaporation pool of the device of the present invention.

In a second preferred embodiment of an adjustment mechanism for the device 10 of the present invention, the evaporation chamber window 310 may be covered by an evaporation chamber window cover 315. For example, FIG. 5 shows an evaporation chamber window cover 315 that is designed such that it slidingly covers the evaporation chamber window 310. The purpose of the evaporation chamber window cover 315 is to allow a user to control the evaporation rate of the device 10. If the user wants to prevent evaporation from occurring within the device 10, the user may slide the evaporation chamber window cover 315 over the evaporation chamber window 310, thereby slowing the evaporation rate and ultimately, the frequency of cycling by the device. If the user desires evaporation of the liquid located in the evaporation pool 320, the user may slide the evaporation chamber window away 315 from the evaporation chamber window 310, thereby opening the evaporation chamber window 310 to the atmosphere and allowing evaporation of the liquid at a more rapid frequency.

Figure 6:
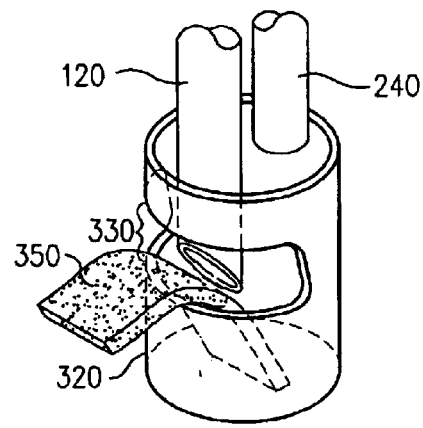
FIG. 6 illustrates an exemplary adjustment embodiment of the evaporation pool of the device of the present invention.

As shown in FIG. 6, in a third preferred embodiment of an adjustment mechanism for the device 10 of the present invention, a user may more readily control the cycle frequency by positioning a sponge or other wicking or absorbing material 350 within the evaporation pool 320 and extending at least partially out of the evaporation pool 320. The purpose of the sponge or other wicking or absorbing material 350 is to increase the surface area of the evaporation pool 320, thereby allowing evaporation of the liquid to occur more rapidly, which in turn allows for more frequent cycling of the device 10 than if the sponge or other wicking or absorbing material 350 were not used.

EXAMPLES

The automatic liquid dispensing device 10 can be used to release measured amounts of liquid in virtually any location and for any climate, plant, and liquid factor. The following examples of how the automatic liquid dispensing device 10 could be used are meant to be exemplary and are not meant to limit the scope of the invention.

Figure 10:
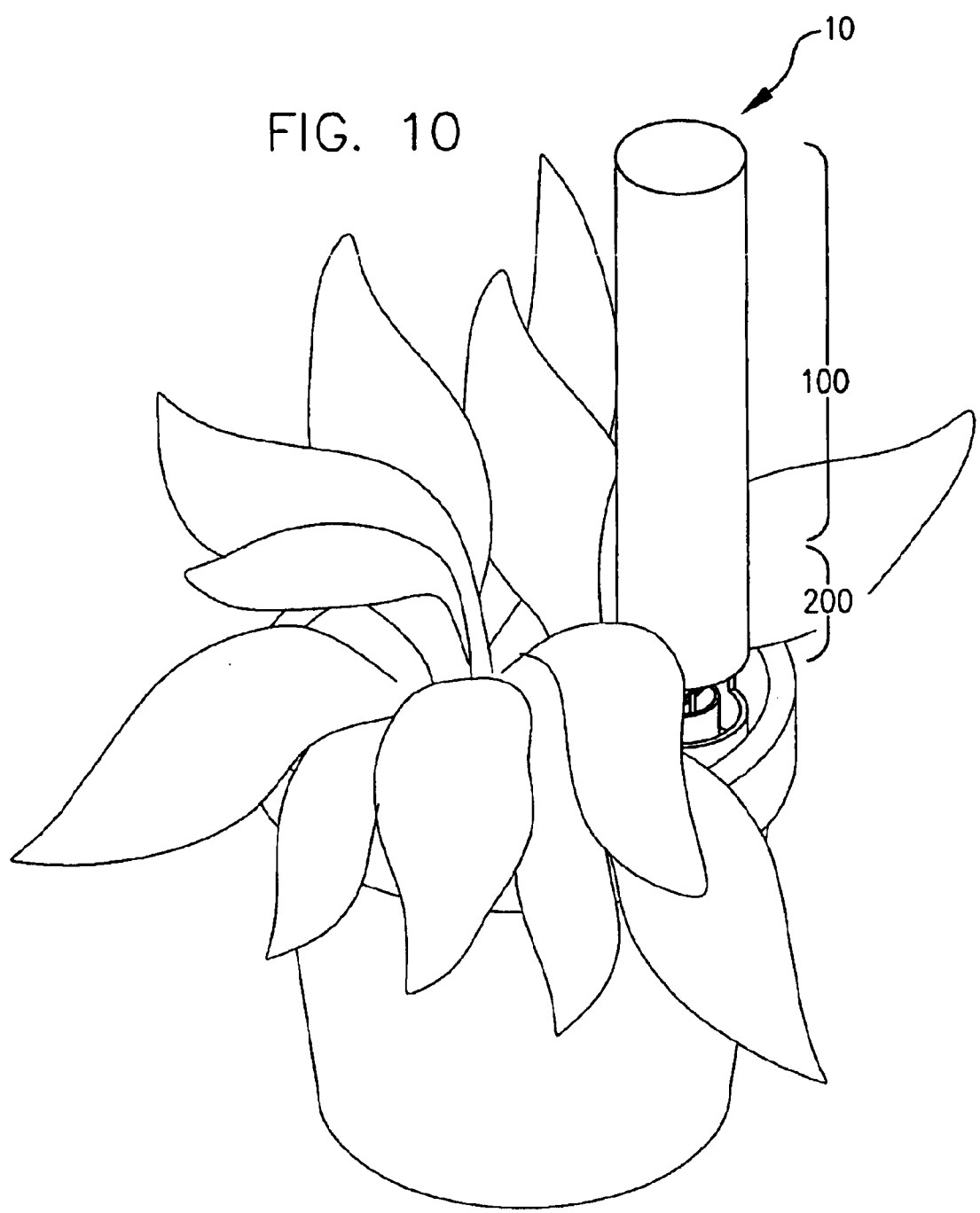
FIG. 10 illustrates an exemplary embodiment of the automatic liquid dispensing device of the present invention.

One exemplary use of the automatic liquid dispensing device 10 is for a traditional potted house plant. Depending on the embodiment, the device 10 could be placed completely within the pot or partially alongside the pot. FIG. 10 illustrates an exemplary embodiment wherein the device 10 of the present invention is placed within the pot. This would allow a user to fill the storage chamber 100 prior to a vacation and not worry about the plant while the user is away on vacation. Alternatively, the device 10 could be filled by a user on a daily basis.

Another exemplary use has to do with how grocery stores pay growers for plants. Specifically, growers are generally paid by grocery stores for a plant that is sold. Damaged or dead plants that are not purchased are returned to the grower. Grocery stores are not in the business of caring for plants and, since they do not have to pay for damaged or dead plants, they have no incentive to provide the care necessary to keep the plant alive. Often the plants in the grocery are cared for by people inexperienced in plant care which often results in over or under providing liquid which may cause damage or death of a plant. Growers could provide a plant to the grocery store with the automatic liquid providing device 10 of the present invention. The grower could fill and position the automatic liquid providing device 10 when they deliver and restock the grocery store's inventory. Alternatively, with minimal training, the grocery store employees could be taught to fill and position the automatic liquid providing device 10. When the plant is purchased, the automatic liquid providing device 10 can be removed or sold with the plant (for an increased cost).

A further exemplary use of the automatic liquid delivery device 10 is for an outdoor plant. Depending on the embodiment, the device 10 could be placed near the plant on the soil or may be embedded in the soil. Oftentimes, outdoor plants, specifically flowers, require significant amounts of liquid throughout the day. Therefore, a user could fill the storage chamber 100 of the device 10 and not have to worry about providing liquid to the plant for a number of days. Alternatively, if preferred, the user could fill the device 10 on a daily basis.

In like manner, because the device 10 is self-contained, it could be used for providing liquid to plants in remote outdoor settings. For example, forest seedlings or highway plantings may often be located in areas where liquid is not easily accessible. By providing a plurality of device's 10 at various locations, or even by providing a singular device 10 and having a number of tubes running from the evaporation chamber 300 to different seedlings or plantings, the plants may be provided with liquid without requiring the significant cost of irrigation systems. Because the device 10 is self-contained, it would only need to be re-filled by a user when the storage chamber 100 was emptied of liquid. This would save both time and effort in trying to ensure that the seedlings or plantings were properly provided with liquid.

Similarly, some geographical locations, such as in Arizona, provide a climate not conducive to providing constant liquid to plants. If these locations make it impossible or impractical to install irrigation systems, the device 10 of the present invention may be placed near the soil (or sand) of the plant, thereby ensuring that the plant is provided with liquid. The device 10 may be re-filled with liquid as needed.

It should be noted that while the device 10 is described in terms of being used for the purpose of providing liquid to plants, the device 10 works with any liquid that evaporates, and therefore, can be used in any setting where providing liquid is desired (e.g. medical, cooking). For example, the present invention may be adapted for alternative purposes such as for providing liquid to a pet, for medicinal purposes (e.g. keeping a wound moist), monitoring fluids in engines, cooking, oil lamps, or any other purpose for which liquid evaporates and can be monitored and replenished.

Although the device of the present invention 10 may be made from almost any material, some exemplary materials include plastic, glass, fiberglass, metal, wood, bamboo, or ceramics.

The terms and expressions used in the foregoing specification are used as terms of description and not of limitation, and are not intended to exclude equivalents of the features shown and described or portions of them. The scope of the invention is defined and limited only by the claims that follow.

What is claimed is:

1. An automatic liquid dispensing device, said device comprising:
   (a) a chamber for storing liquid;
   (b) a chamber for measuring an amount of liquid, said chamber for measuring operatively connected to said chamber for storing and suitable to receive a portion of said liquid therefrom;
   (c) a chamber for allowing liquid to evaporate, said chamber for allowing said liquid to evaporate operatively connected to said chamber for measuring and suitable to receive a portion of said liquid therefrom; and
   (d) wherein evaporation of said liquid causes said liquid to flow through said chamber for measuring at least partially into said chamber for allowing said liquid to evaporate, and onto a liquid recipient.

2. The device of claim 1 wherein said device is positioned substantially on top of soil adjacent to a plant.

3. The device of claim 1, further including at least one adjustment mechanism for adjusting evaporation in said chamber for allowing said liquid to evaporate.

4. The device of claim 1, wherein said chamber for storing liquid is under vacuum.

5. The device of claim 1, further including a cover slidingly located over said chamber for allowing said liquid to evaporate.

6. The device of claim 1, further including absorbing material adjustably located at least partially within said chamber for allowing said liquid to evaporate.

7. The device of claim 1, further including a plug removably connected to said chamber for storing liquid.

8. The device of claim 1, further including a storage/measuring passage that operatively connects said chamber for storing liquid and said chamber for measuring an amount of liquid.

9. The device of claim 1, further including a measuring/evaporation liquid supply passage that operatively connects said chamber for measuring an amount of liquid and said chamber for allowing liquid to evaporate.

10. The device of claim 9, wherein said measuring/evaporation liquid supply passage is an inverted U-shape siphon.

11. The device of claim 1, further including a measuring/evaporation air supply passage that operatively connects said chamber for measuring an amount of liquid and said chamber for allowing liquid to evaporate.

12. The device of claim 1, further including said chamber for allowing liquid to evaporate operatively connected to said chamber for storing liquid.

13. The device of claim 12, wherein a storage/evaporation passage operatively connects said chamber for allowing liquid to evaporate and said chamber for storing liquid.

14. The device of claim 1, wherein an evaporation pool is inset in said chamber for allowing liquid to evaporate.

15. The device of claim 14, said device further comprising a height adjustment mechanism capable of adjusting said evaporation pool.

16. The device of claim 1, said device further comprising a tubular transport structure for transporting liquid from said chamber for allowing liquid to evaporate onto said liquid recipient.

17. The device of claim 1, said device further comprising a storage/measuring separator separating said chamber for measuring an amount of liquid and said chamber for storing liquid.

18. The device of claim 1, said device further comprising a measuring/evaporation separator separating said chamber for allowing liquid to evaporate and said chamber for measuring an amount of liquid.

* * * * *